United States Patent
Kuo et al.

(10) Patent No.: US 7,133,735 B2
(45) Date of Patent: Nov. 7, 2006

(54) EXPERIMENT MANAGEMENT SYSTEM AND METHOD THEREOF IN SEMICONDUCTOR MANUFACTURING ENVIRONMENT

(75) Inventors: Wen-Chang Kuo, Hsinchu (TW); Chien-Chung Huang, Taichung (TW); Huei-Wen Yang, Taichung (TW); Yi-Lin Huang, Keelung (TW)

(73) Assignee: Taiwan Semiconductor Manufacturing Co., Ltd, Hsin-Chu (TW)

( * ) Notice: Subject to any disclaimer, the term of this patent is extended or adjusted under 35 U.S.C. 154(b) by 148 days.

(21) Appl. No.: 11/043,143

(22) Filed: Jan. 27, 2005

(65) Prior Publication Data

US 2006/0167578 A1  Jul. 27, 2006

(51) Int. Cl.
*G06F 19/00* (2006.01)
(52) U.S. Cl. .................. 700/103; 700/95; 700/97; 438/15; 438/16
(58) Field of Classification Search .......... 700/95, 700/97, 103; 438/15, 16
See application file for complete search history.

(56) References Cited

U.S. PATENT DOCUMENTS

| 6,341,243 B1 * | 1/2002 | Bourne et al. ............. 700/165 |
| 6,415,196 B1 * | 7/2002 | Crampton et al. .......... 700/100 |
| 6,604,012 B1 * | 8/2003 | Cho et al. ................. 700/121 |
| 6,984,198 B1 * | 1/2006 | Krishnamurthy et al. ..... 438/14 |
| 2005/0197986 A1 * | 9/2005 | Schuppert et al. ............ 706/45 |

OTHER PUBLICATIONS

"Design of Automated Experiment Management System with Applications to R&D and Large Volume Semiconductor Manufacturing"-Jun et al, Applied Materials Inc., IEEE 2005.*
"A Macromodeling Based Approach For Efficient IC Yield Optimization"-Feldmann et al, Carnegie Mellon University, IEEE CH 3006-4/91/0000—2260.*
"Model-Based Product Quality Control"-Ramakrishnan et al, Intel Corporation, IEEE 1995.*

* cited by examiner

*Primary Examiner*—Michael D. Masinick
(74) *Attorney, Agent, or Firm*—Birch, Stewart, Kolasch & Birch, LLP

(57) ABSTRACT

A system and method thereof for experiment management. A storage device stores an experiment plan record, a merge constraint and an integration rule. A processing unit configured to acquire a first experiment plan from the experiment plan record, and a second experiment plan. The processing unit generates an integrated experiment plan by merging the first experiment plan and the second experiment plan according to the merge constraint and the integration rule, and stores the integrated experiment plan to the storage device.

23 Claims, 9 Drawing Sheets

| Operator | Type | Lot# | Quantity | Route_Type | Technology | Steps | Object | Time |
|---|---|---|---|---|---|---|---|---|
| Eng_A | Experiment | A | 3 | R1-1 | 90nm | 4-6 | OD layer etching recipe tuning | 2004/10/10 |
| Eng_B | Experiment | B | 2 | R1-2 | 90nm | (M-2)-M | Metal layer etching recipe tuning | 2004/10/10 |
| Eng_C | Experiment | C | 3 | R1-1 | 90nm | 4-6 | OD layer electrical test | 2004/10/10 |

FIG. 3a

| Operator | Type | Lot# | Quantity | Route_Type | Technology | Steps | Object | Time |
|---|---|---|---|---|---|---|---|---|
| Eng_A | Experiment | D | 3 | R1-2 | 90nm | 4-6;(M-2)-M | OD layer etching recipe tuning; Metal layer etching recipe tuning; OD layer electrical test | 2004/10/10 |
| Eng_B | | | | | | | | |
| Eng_C | | | | | | | | |

| Operator | Type | Quantity | Route_Type | Technology | Steps | Object | Time |
|---|---|---|---|---|---|---|---|
| Eng_C | Experiment | 3 | R1-1 | 90nm | 4-6 | OD layer electrical test | 2004/10/10 |

FIG. 6a

| Operator | Type | Lot# | Quantity | Route_Type | Technology | Steps | Object | Time |
|---|---|---|---|---|---|---|---|---|
| Eng_A<br>Eng_B | Experiment | D | 3 | R1-2 | 90nm | 4-6;(M-2)-M | OD layer etching recipe tuning;<br>Metal layer etching recipe tuning | 2004/10/10 — 631 |

FIG. 6b

| Operator | Type | Lot# | Quantity | Route_Type | Technology | Steps | Object | Time |
|---|---|---|---|---|---|---|---|---|
| Eng_A<br>Eng_B<br>Eng_C | Experiment | D | 3 | R1-2 | 90nm | 4-6;(M-2)-M | OD layer etching recipe tuning;<br>Metal layer etching recipe tuning;<br>OD layer electrical test | 2004/10/10 — 241 |

FIG. 6c

EXPERIMENT MANAGEMENT SYSTEM AND METHOD THEREOF IN SEMICONDUCTOR MANUFACTURING ENVIRONMENT

BACKGROUND

The present invention relates to semiconductor manufacturing technology, and more particularly, to a method and system of experiment management employed in a semiconductor manufacturing environment.

A conventional semiconductor factory typically includes the requisite fabrication tools to process semiconductor wafers for a particular purpose, such as photolithography, chemical-mechanical polishing, or chemical vapor deposition. During manufacture, the semiconductor wafer passes through a series of process steps, which are performed by various fabrication tools. For example, in the production of an integrated semiconductor product, the semiconductor wafer passes through up to 600 process steps.

In order to develop a new generation technology such as 90 nm or 65 nm semiconductor product, numerous experiment plans may be designed and performed. For example, a new material may be applied in a specific layer in a semiconductor product, a recipe may be tuned in active layer or metal layer etching, or an active layer electrical test may be performed. The object of experiment plans is typically to increase device performance or yield, or identify causal events for failed wafers. These experiment plans, however, consume numerous resources such as sample wafers, tool capacities, or others, resulting in increased development costs. In some situations, two or more experiment plans can be integrated into a single experiment to reduce development costs. Conventionally, experiment plans are merged manually, requiring an operator to examine hundreds of experiment records merging some into a single experiment under relevant circumstances. The labor-intensive nature of experiment plan merging using conventional means severely hinders efficiency. Additionally, it is difficult to merge experiments in real-time by relying on manual effort alone to satisfy a rapid response requirement. Therefore, a need exists for a system and method of experiment management that provides an effective merging mechanism for various experiment plans, thereby reducing development costs.

SUMMARY

An embodiment of a system for experiment management comprises a storage device and a processing unit. The storage device stores an experiment plan record, a merge constraint and an integration rule. The processing unit is configured to acquire a first experiment plan from the experiment plan record, and a second experiment plan. The processing unit generates an integrated experiment plan by merging the first experiment plan and the second experiment plan according to the merge constraint and the integration rule, and stores the integrated experiment plan to the storage device. The merge constraint defines rules that any two experiment plans can be merged, the integration rule determines the content of the integrated experiment plan based on the first experiment plan and the second experiment plan. Preferably, the processing unit transmits a merge notice prompting that the first experiment plan and the second experiment plan can be merged, and receives a confirmation message corresponding to the merge notice. The confirmation message represents acceptance of the merge action.

The system may additionally comprise a manufacturing execution system (MES) or a computer incorporation manufacturing (CIM) system loading and performing the integrated experiment plan. The MES or CIM system may perform the integrated experiment plan with a semiconductor fabrication tool.

An embodiment of methods for experiment management comprises acquiring a first experiment plan and a second experiment plan, generating an integrated experiment plan by merging the first experiment plan and the second experiment plan according to a merge constraint and an integration rule, and storing the integrated experiment plan. Preferably, the method additionally comprises transmitting a merge notice prompting that the first experiment plan and the second experiment plan can be merged, and receiving a confirmation message corresponding to the merge notice, the confirmation message representing acceptance of the merge action.

An embodiment of a machine-readable storage medium stores a computer program which when executed performs the method of experiment management.

The merge constraint defines rules that any two experiment plans can be merged. In one example, the merge constraint defines that the first experiment plan and the second experiment plan can be merged when both the first and second experiment plans use the same technology and optical mask. In another example, the merge constraint defines that both the first experiment plan and the second experiment plan having mergable processing steps can be merged. In yet another example, the merge constraint defines that a second experiment plan can be merged into a first experiment plan having no destructive test.

The integration rule determines the content of the integrated experiment plan based on the first experiment plan and the second experiment plan. The integration rule may determine sample quantity, route type, and/or experiment time for the integrated experiment plan. In an example, the integration rule acquires a maximum sample quantity of the first and second experiment plans as an integrated sample quantity for the integrated sample plan. In another example, the integration rule determines processing steps for the integrated experiment plan based on processing steps in the first and second experiment plans.

BRIEF DESCRIPTION OF THE DRAWINGS

The aforementioned objects, features and advantages of the invention will become apparent by referring to the following detailed description of embodiments with reference to the accompanying drawings, wherein:

FIG. 3a is a diagram of exemplary experiment plan records according to a first embodiment of the invention;

FIG. 3b is a diagram of an exemplary integrated experiment plan record based on the experiment plan records of FIG. 3a;

FIG. 6*a* is a diagram of exemplary experiment plan according to a second embodiment of the invention;

FIG. 6*b* is a diagram of an exemplary historical experiment plan record according to a second embodiment of the invention;

FIG. 6*c* is a diagram of an exemplary integrated experiment plan record based on experiment plan of FIG. 6*a* and the historical experiment plan record of FIG. 6*b*;

DESCRIPTION

Figure 1:
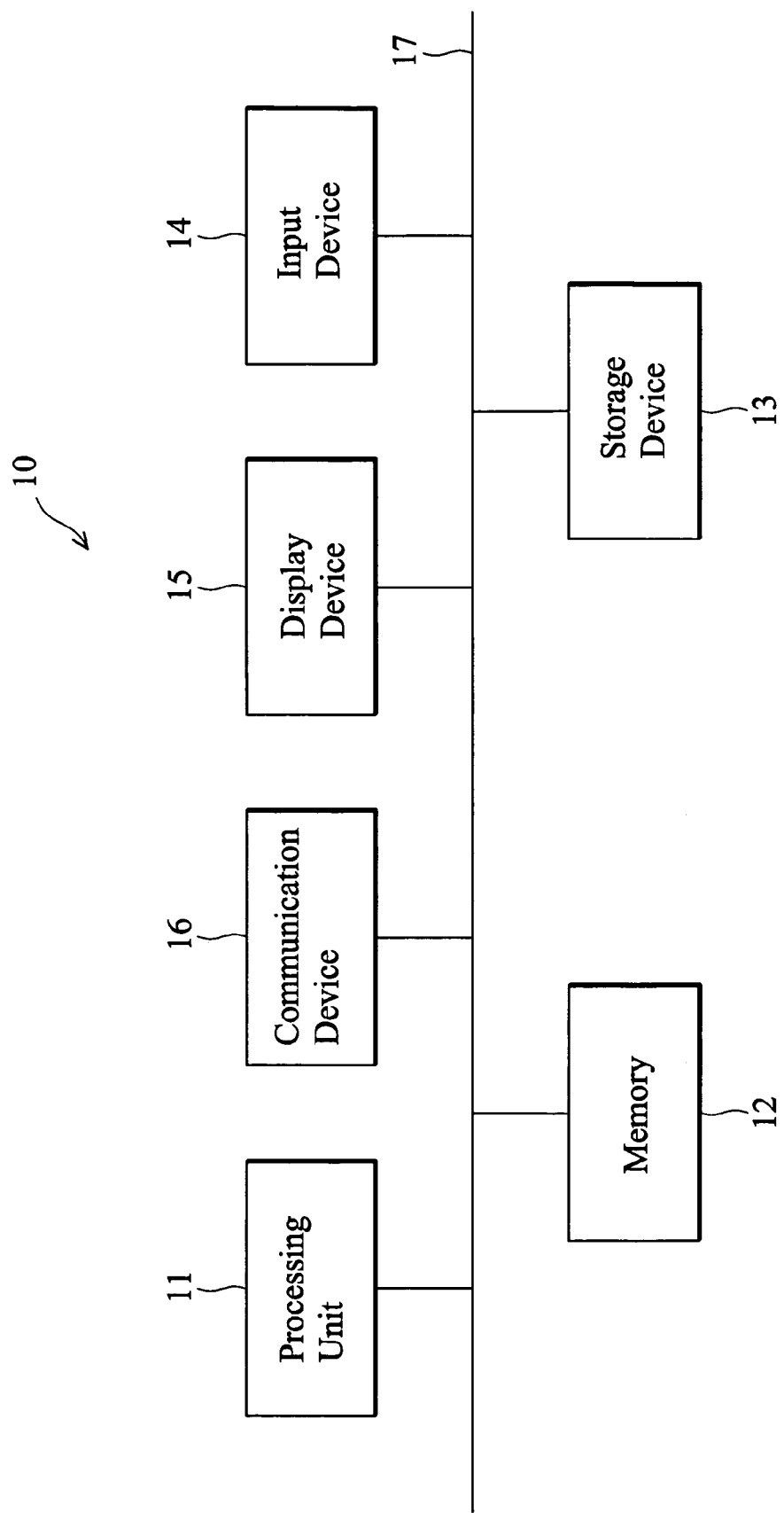
FIG. 1 is a diagram of an embodiment of a hardware environment.

The following disclosure provides many different embodiments and examples for implementing different features of the invention. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself indicate a relationship between the various embodiments and/or configurations discussed.

FIG. 1 is a diagram of an embodiment of a hardware environment. The description of FIG. 1 provides a brief, general description of suitable computer hardware and a suitable computing environment in conjunction with which at least some embodiments of the invention may be implemented. The hardware environment of FIG. 1 includes a processing unit 11, a memory 12, a storage device 13, an input device 14, a display device 15 and a communication device 16. The processing unit 11 is connected by buses 17 to the memory 12, storage device 13, input device 14, display device 15 and communication device 16 based on Von Neumann architecture. There may be one or more processing units 21, such that the processor of the computer comprises a single central-processing unit (CPU), a micro processing unit (MPU) or multiple processing units, commonly referred to as a parallel processing environment. The memory 12 is preferably a random access memory (RAM), but may also include read-only memory (ROM) or flash ROM. The memory 12 preferably stores program modules executed by the processing unit 11 to perform experiment management functions. Generally, program modules include routines, programs, objects, components, or others, that perform particular tasks or implement particular abstract data types. Moreover, those skilled in the art will understand that at least some embodiments may be practiced with other computer system configurations, including hand-held devices, multiprocessor-based, microprocessor-based or programmable consumer electronics, network PC's, mini-computers, mainframe computers, and the like. Some embodiments may also be practiced in distributed computing environments where tasks are performed by remote processing devices linked through a communication network. In a distributed computing environment, program modules may be located in both local and remote memory storage devices based on various remote access architecture such as DCOM, CORBA, Web object, Web Services or other similar architectures. The storage device 13 may be a hard drive, magnetic drive, optical drive, a portable drive, or nonvolatile memory drive. The drives and associated computer-readable media thereof (if required) provide nonvolatile storage of computer-readable instructions, data structures, program modules and experiment lot processing records. The processing unit 11, controlled by program modules received from the memory 12 and from an operator through the input device, directs experiment management functions. The storage device 13 may comprise a database management system, an object base management system, a file management system, or others, to store multiple experiment plan records, merge constraints and scheduling rules.

FIRST EMBODIMENT

Figure 2:
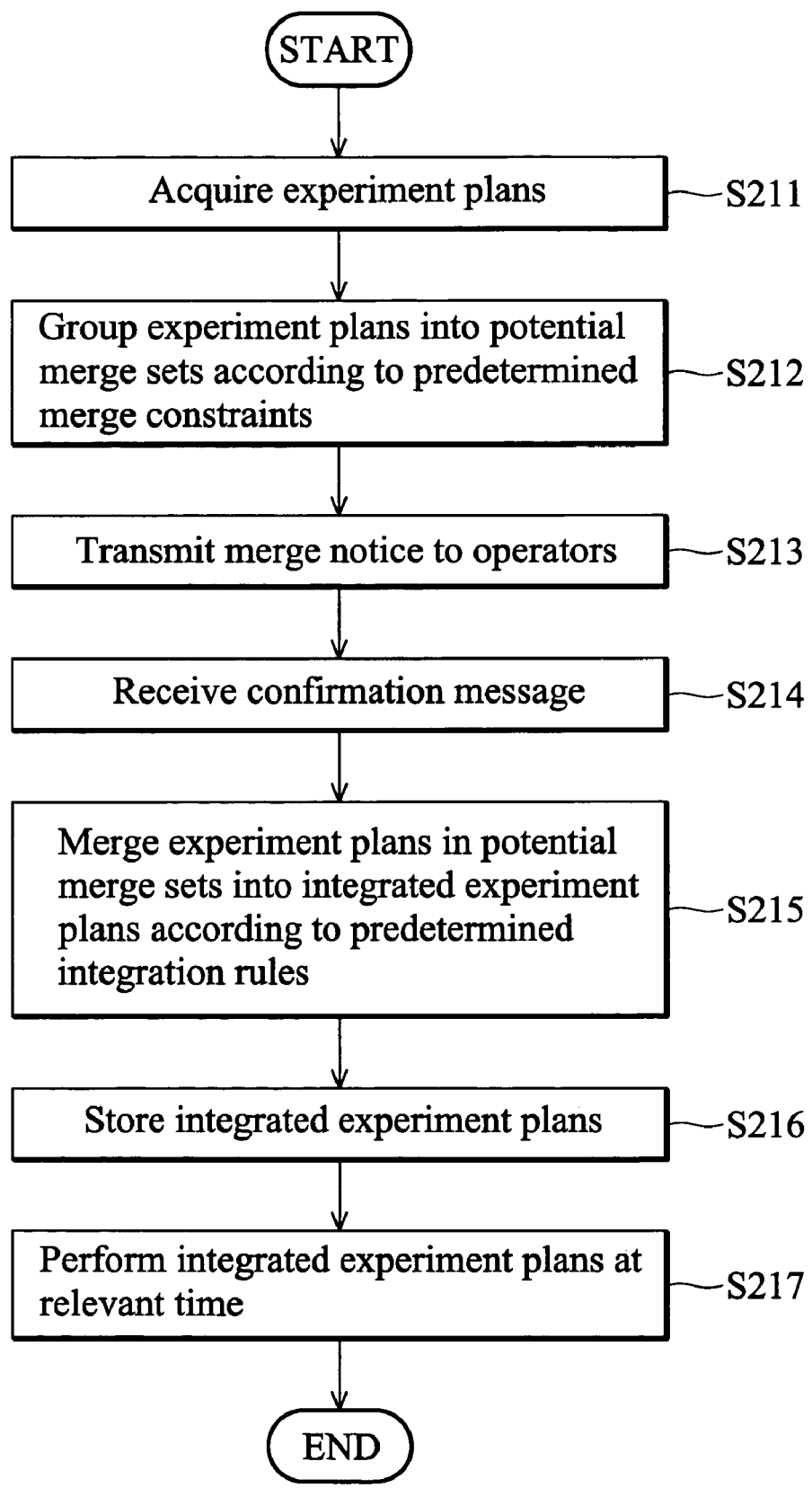
FIG. 2 is a flowchart showing methods of experiment management according to a first embodiment of the invention.

A first embodiment discloses methods for experiment management using batch processing, and the methods are implemented in program modules and executed by the processing unit 11. FIG. 2 is a flowchart showing methods of experiment management according to the first embodiment. The process of FIG. 2 begins in step S211 to acquire experiment plan records from the storage device 13. FIG. 3*a* is a diagram of exemplary experiment plan records according to the first embodiment, including three records 331 to 333. The experiment plan records store experiment information, and each preferably includes nine fields such as experiment operator 341, lot type 342, lot number 343, sample quantity 344, processing route type 345, technology 346 such as 90 nm, 65 nm and the like, concerned steps 347, experiment object 348 and experiment time 349. The lot number 343 may store a key to a specific physical lot. The experiment operator 341 may store information indicating who owns the experiment. The processing route type 345 may store information indicating a specific semiconductor process for at least one semiconductor product such as RAM, flash ROM, DVD driver IC, CPU and the like. The processing route type 345 may be employed as a foreign key to acquire processing steps from other records using an ANSI SQL query, an object query or a file manipulation instruction set. The concerned steps 347 may store information indicating specific processing steps that the experiment concerned. The start time 349 may store information indicating when the experiment starts. Consistent with the scope and spirit of the invention, additional or different contents may be provided in the experiment plan records. The implementation of the experiment plan records described above is not limited to a single table/file/data object, but also to multiple related tables/files/data objects.

In step 212, experiment plans are grouped into potential merge sets according to predetermined merge constraints in the storage device 13. In one example, a merge constraint defines that any two of the experiment plans can be merged when both plans use the same technology and optical mask. In another example, a merge constraint defines that any two of the experiment plans having mergable processing steps can be merged. In yet another example, a merge constraint defines that an experiment plan can be merged into another experiment plan having no destructive test. Such constraints may be expressed as meta-rules (rule templates), as the maximum or minimum number of predicates that can occur in the rule antecedent or consequent, or as relationships among attributes, attribute values, and/or aggregates. Those having skill in the art will appreciate that additional or different constraints may be provided. For example, experiment plans corresponding to records 331 to 333 are grouped into a potential merge set because they all use the same technology and optical mask, have mergable processing steps, and have no destructive test therein.

In step S213, for each experiment plan in the potential merge sets, a merge notice is transmitted to a specific operator handling the experiment plan via a client application such as a browser, a window client and the like, a pager, a mobile phone, or others. The merge notice prompts an operator that an experiment plan he/she handled can be merged with one or more experiment plans, and asks for a confirmation message representing acceptance or rejection of the merge action. For example, merge notices are respectively transmitted to operators "Eng_A", "Eng_B" and "Eng_C".

In step S214, confirmation messages are received from operators. When a rejection message is received, the corresponding experiment plan is removed from the potential merge set. Those skilled in the art will recognize that steps S213 and S214 may be omitted to increase performance if the confirmation is irrelevant. For example, acceptance messages are respectively received from operators "Eng_A", "Eng_B" and "Eng_C", thus, none of the experiment plans in the potential merge set is removed.

In step S215, experiment plans in each potential merge set are merged into integrated experiment plans according to predetermined integration rules in the storage device 13. The integration rules may determine sample quantity, route type, and/or experiment time for a specific integrated experiment plan. For example, an integration rule acquires a maximum sample quantity of all experiment plans in a potential merge set as an integrated sample quantity. Another integration rule determines integrated processing steps based on all processing steps of experiment plans in a potential merge set. Such integration rules may be expressed as meta-rules (rule templates), as the maximum or minimum number of predicates that can occur in the rule antecedent or consequent, or as relationships among attributes, attribute values, and/or aggregates. Those skilled in the art will appreciate that additional or different rules may be provided.

In step S216, integrated experiment plans are stored to the storage device 13. FIG. 3b is a diagram of an exemplary integrated experiment plan record based on records 331 to 333. Consistent with the scope and spirit of the invention, additional or different contents may be provided in the integrated experiment plan record. The implementation of the integrated experiment plan record described above is not limited to a single table/file/data object, but also to multiple related tables/files/data objects. In spite of the storage of the integrated experiment plans, in this step, all experiment plan records, for example 331 to 333, with experiment plans have been merged are removed from the storage device 13.

In step S217, integrated experiment plans are performed at a relevant time via a manufacturing execution system (MES, not shown) with relevant fabrication tools (not shown). The fabrication tools (not shown) typically perform a single wafer fabrication operation upon the wafers in the experiment lot. For example, a particular fabrication tool may perform a layering operation, a patterning operation, a doping operation or a heat treatment upon the wafers. The wafer fabrication operation is performed according to a predefined procedure (i.e., a predetermined set of steps or "recipe"). The MES (not shown) may be an integrated computer system representing the methods and tools used to accomplish production. For example, the primary functions of the MES (not shown) may include collecting experiment data in real time, organizing and storing the experiment data in a centralized database, work order management, fabrication tool management and process management. Examples of the MES (not shown) include Promis (Brooks Automation Inc. of Massachusetts), Workstream (Applied Materials, Inc. of California), Poseidon (IBM Corporation of New York), and Mirl-MES (Mechanical Industry Research Laboratories of Taiwan). Each MES may have a different application area. For example, Mirl-MES may be used in applications involving packaging, liquid crystal displays (LCDs), and printed circuit boards (PCBs), while Promis, Workstream, and Poseidon may be used for IC fabrication and thin film transistor LCD (TFT-LCD) applications.

Figure 4:
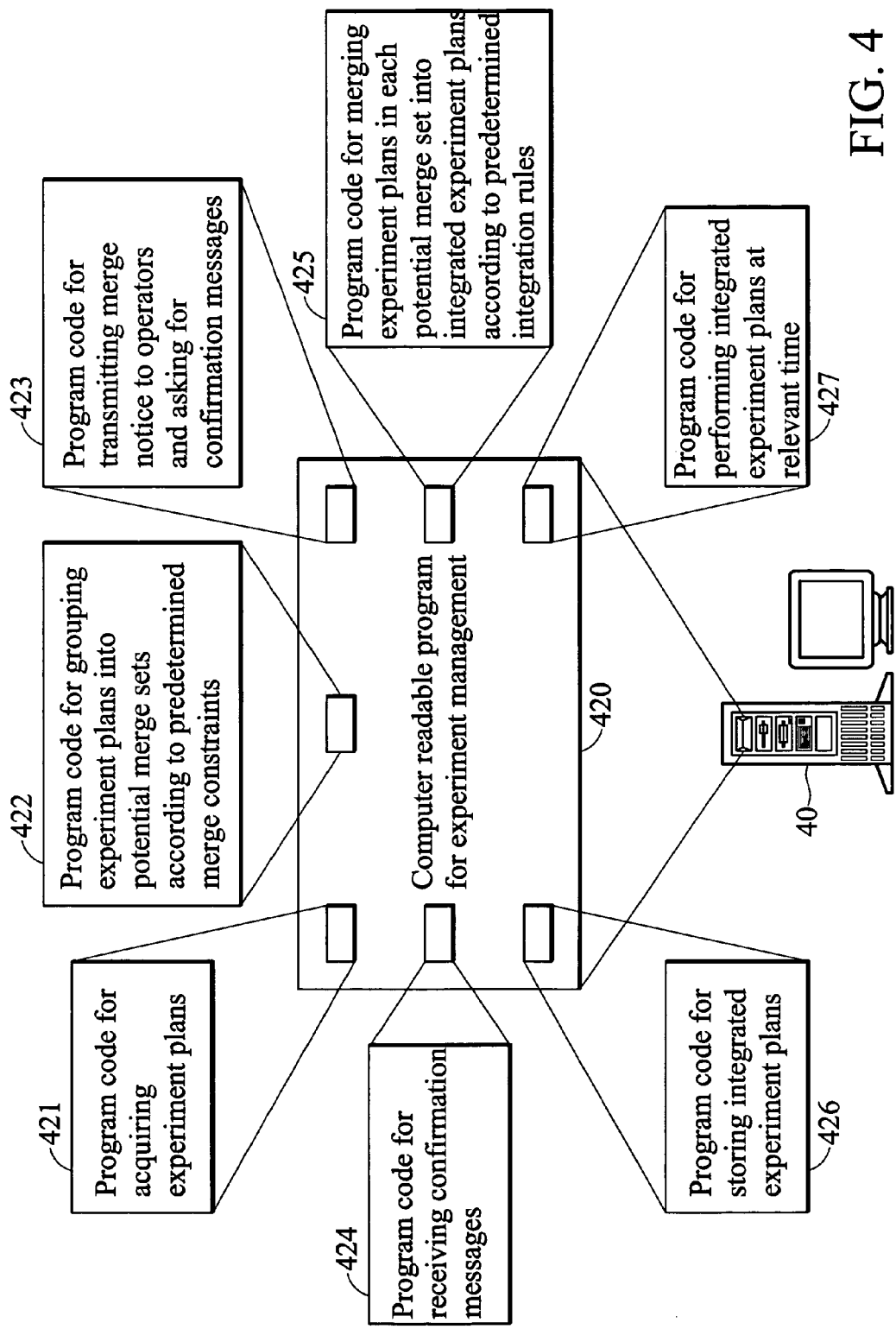
FIG. 4 is a diagram of a storage medium for storing a computer program providing the method of experiment management according to a first embodiment of the invention.

The first embodiment additionally discloses a storage medium as shown in FIG. 4 storing a computer program 420 providing the disclosed methods of experiment management. The computer program product includes a storage medium 40 having computer readable program code embodied in the medium for use in a computer system, the computer readable program code comprising at least computer readable program code 421 acquiring experiment plans, computer readable program code 422 grouping experiment plans into potential merge sets according to predetermined merge constraints, computer readable program code 423 transmitting merge notice to operators and asking for confirmation messages, computer readable program code 424 receiving confirmation messages, computer readable program code 425 merging experiment plans in each potential merge set into integrated experiment plans according to predetermined integration rules, computer readable program code 426 storing integrated experiment plans and computer readable program code 427 performing integrated experiment plans at relevant time.

SECOND EMBODIMENT

Figure 5:
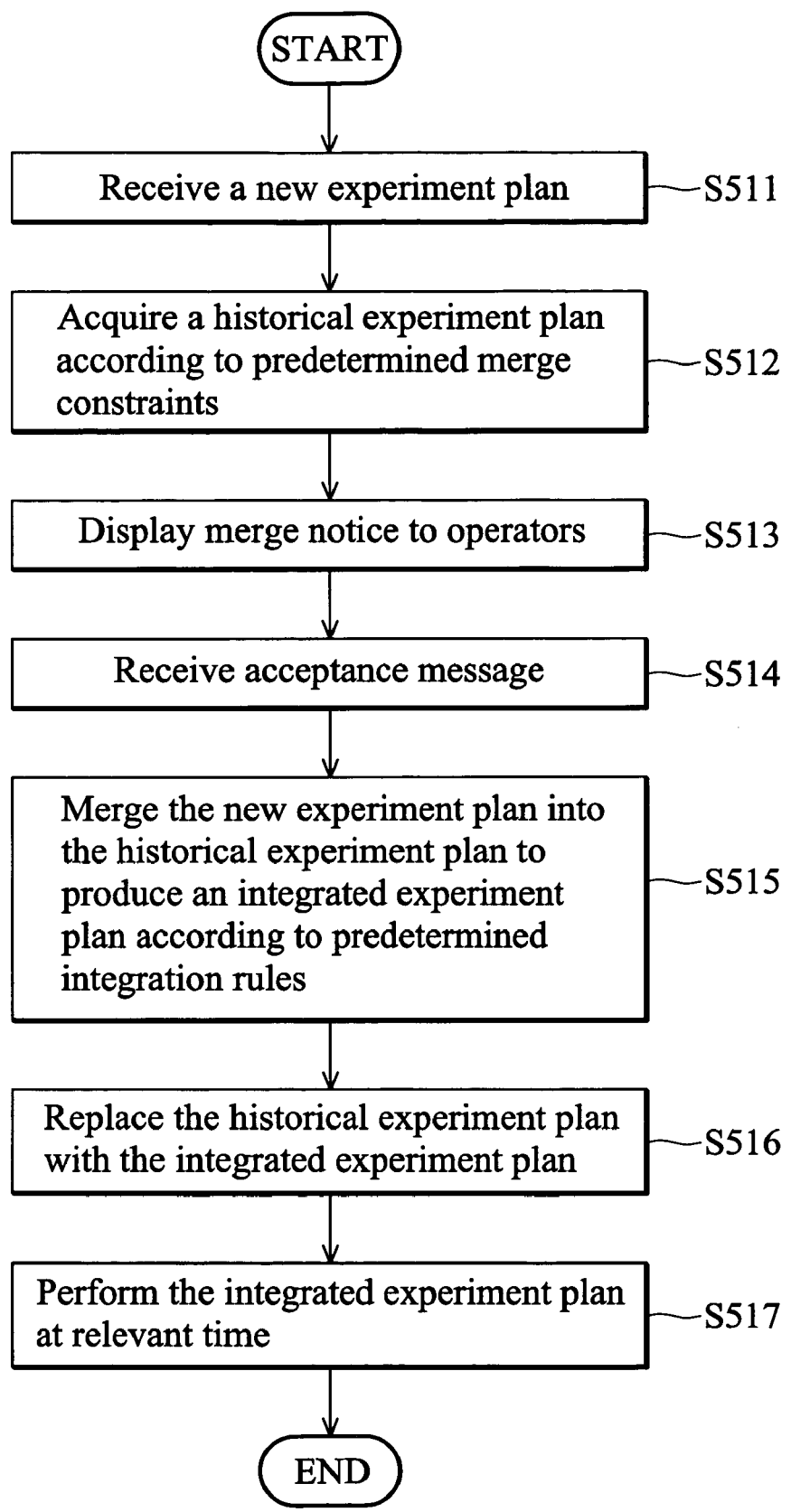
FIG. 5 is a flowchart showing methods of experiment management according to a second embodiment of the invention.

A second embodiment discloses ad-hoc methods for experiment management, and the methods are implemented in program modules and executed by the processing unit 11. FIG. 5 is a flowchart showing methods of experiment management according to the second embodiment. The process of FIG. 5 begins in step S511 to receive a new experiment plan from an operator "Eng_C" via a user interface. FIG. 6a is a diagram of exemplary experiment plan according to the second embodiment. The new experiment plan includes various experiment information such as experiment owner, sample quantity, route type, usage of technology, concerned processing steps, object and experiment time.

In step 512, a historical experiment plan is acquired from an experiment plan record in the storage device 13 according to predetermined merge constraints in the storage device 13. In one example, a merge constraint defines that any two experiment plans can be merged when both plans use the same technology and optical mask. In another example, a merge constraint defines that any two of the experiment plans having mergable processing steps can be merged. In yet another example, a merge constraint defines that an experiment plan can be merged into another experiment plan having no destructive test. Such constraints may be expressed as meta-rules (rule templates), as the maximum or minimum number of predicates that can occur in the rule antecedent or consequent, or as relationships among attributes, attribute values, and/or aggregates. Those skilled in the art will appreciate that additional or different constraints may be provided. FIG. 6b is a diagram of exemplary experiment plan record according to the second embodiment. For example, an experiment plan corresponding to record 631 is acquired because it uses the same technology and optical mask as the new experiment plan, has mergable processing steps with the new experiment plan, and has no destructive test therein. The historical experiment plan record is capable of storing experiment information, and preferably includes nine fields such as experiment operator 641, lot type 642, lot number 643, sample quantity 644, processing route type 645, technology 646 such as 90 nm or 65 nm, concerned steps 647, experiment object 648 and experiment time 649. The lot number 643 may store a key to a specific physical lot. The experiment operator 641 may store information indicating who owns the experiment. The processing route type 645 may store information indicating a specific semiconductor process for at least one semiconductor product such as RAM, flash ROM, DVD driver IC, CPU and the like. The processing route type 645 may be employed as a foreign key to acquire processing steps from other records using an ANSI SQL query, an object query or a file manipulation instruction set. The concerned steps 647 may store information indicating specific processing steps that the experiment concerned. The start time 649 may store information indicating when the experiment starts. Consistent with the scope and spirit of the invention, additional or different contents may be provided in the experiment plan historical record. The implementation of the historical experiment plan record described above is not limited to a single table/file/data object, but also to multiple related tables/files/data objects.

In step S522, a merge notice is displayed to an operator via the user interface. The merge notice prompts an operator that the experiment plan he/she handled can be merged into another experiment plan, and asks for a confirmation message representing acceptance or rejection of the merging action.

In step S523, confirmation message is received. When a rejection message is received, the process stops, and otherwise proceeds to the next step. Those skilled in the art will recognize that steps S522 and S523 may be omitted to increase performance if the confirmation is irrelevant.

In step S524, the new experiment plan is merged into the historical experiment plans to produce an integrated experiment plan according to predetermined integration rules in the storage device 13. The integration rules may determine sample quantity, route type, and/or experiment time for a new integrated experiment plan. For example, an integration rule acquires a maximum sample quantity of two experiment plans as an integrated sample quantity. Another integration rule determines integrated processing steps based on processing steps of the above two experiment plans. Such integration rules may be expressed as meta-rules (rule templates), as the maximum or minimum number of predicates that can occur in the rule antecedent or consequent, or as relationships among attributes, attribute values, and/or aggregates. Those skilled in the art will appreciate that additional or different rules may be provided.

In step S525, a historical experiment plan in a historical experiment record is replaced with an integrated experiment plan. FIG. 6c is a diagram of an exemplary integrated experiment plan record based on experiment plan of FIG. 6a and the historical experiment plan record of FIG. 6b. Consistent with the scope and spirit of the invention, additional or different contents may be provided in the integrated experiment plan record. The implementation of the integrated experiment plan record described above is not limited to a single table/file/data object, but also to multiple related tables/files/data objects.

In step S526, an integrated experiment plan is performed at a relevant time via a manufacturing execution system (MES, not shown) with relevant fabrication tools (not shown). The fabrication tool (not shown) typically performs a single wafer fabrication operation upon the wafers in the experiment lot. For example, a particular fabrication tool may perform a layering operation, a patterning operation, a doping operation or a heat treatment upon the wafers. The wafer fabrication operation is performed according to a predefined procedure (i.e., a predetermined set of steps or "recipe"). The MES (not shown) may be an integrated computer system representing the methods and tools used to accomplish production. For example, the primary functions of the MES (not shown) may include collecting experiment data in real time, organizing and storing the experiment data in a centralized database, work order management, fabrication tool management and process management. Examples of the MES (not shown) include Promis (Brooks Automation Inc. of Massachusetts), Workstream (Applied Materials, Inc. of California), Poseidon (IBM Corporation of New York), and Mirl-MES (Mechanical Industry Research Laboratories of Taiwan). Each MES may have a different application area. For example, Mirl-MES may be used in applications involving packaging, liquid crystal displays (LCDs), and printed circuit boards (PCBs), while Promis, Workstream, and Poseidon may be used for IC fabrication and thin film transistor LCD (TFT-LCD) applications.

Figure 7:
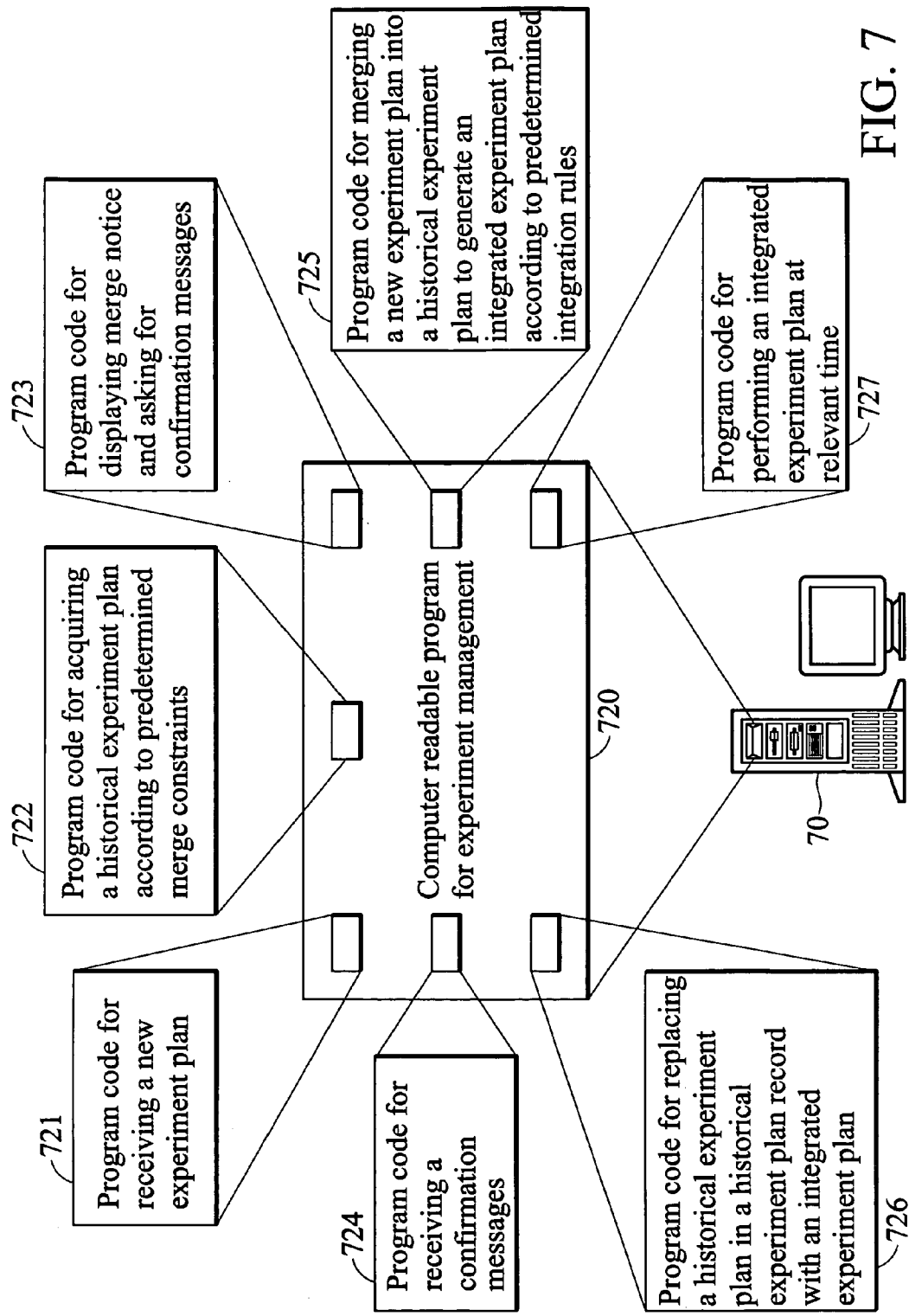
FIG. 7 is a diagram of storage medium for a computer program providing the method of experiment management according to a second embodiment of the invention.

The second embodiment additionally discloses a storage medium as shown in FIG. 7 storing a computer program 720 providing the disclosed methods of experiment management. The computer program product includes a storage medium 70 having computer readable program code embodied in the medium for use in a computer system, the computer readable program code comprising at least computer readable program code 721 receiving a new experiment plan, computer readable program code 722 acquiring a historical experiment plan according to predetermined merge constraints, computer readable program code 723 displaying a merge notice and asking for confirmation messages, computer readable program code 724 receiving a confirmation message, computer readable program code 725 merging a new experiment plan into a historical experiment plan to generate an integrated experiment plan according to predetermined integration rules, computer readable program code 726 replacing a historical experiment plan in a historical experiment plan record with an integrated experiment plan and computer readable program code 727 performing an integrated experiment plan at relevant time.

The methods and systems of the embodiments, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A system of experiment management, the system comprising:
   a storage device capable of storing an experiment plan record, a merge constraint and an integration rule; and
   a processing unit configured to acquire a first experiment plan from the experiment plan record, and a second experiment plan, generate an integrated experiment plan by merging the first experiment plan and the second experiment plan according to the merge constraint and the integration rule, and store the integrated experiment plan to the storage device,
   wherein the merge constraint defines rules that any two experiment plans can be merged, the integration rule determines the content of the integrated experiment plan based on the first experiment plan and the second experiment plan.

2. The system of claim 1 wherein the merge constraint defines that the first experiment plan and the second experiment plan can be merged when both the first and second experiment plans use the same technology and optical mask.

3. The system of claim 1 wherein the merge constraint defines that both the first experiment plan and the second experiment plan having mergable processing steps can be merged.

4. The system of claim 1 wherein the merge constraint defines that the second experiment plan can be merged into the first experiment plan having no destructive test.

5. The system of claim 1 wherein the processing unit transmits a merge notice prompting that the first experiment plan and the second experiment plan can be merged, and receives a confirmation message corresponding to the merge notice, the confirmation message represents acceptance of the merge action.

6. The system of claim 1 wherein the integration rule determines sample quantity, route type, and/or experiment time for the integrated experiment plan.

7. The system of claim 1 wherein the integration rule acquires a maximum sample quantity of the first and second experiment plans as an integrated sample quantity for the integrated sample plan.

8. The system of claim 1 wherein the integration rule determines processing steps for the integrated experiment plan based on processing steps in the first and second experiment plans.

9. The system of claim 1 further comprising a manufacturing execution system (MES) or a computer incorporation manufacturing (CIM) system loading and performing the integrated experiment plan.

10. The system of claim 9 wherein the MES or CIM system performs the integrated experiment plan with a semiconductor fabrication tool.

11. The system of claim 1 wherein the second experiment plan is acquired from the experiment plan record, and the integrated experiment plan is generated using a batch processing mechanism.

12. The system of claim 1 wherein the second experiment plan is acquired from an operator via a user interface, and the integrated experiment plan is generated using an ad hoc processing mechanism.

13. A method of experiment management, the method comprising using a computer to perform the steps of:
   acquiring a first experiment plan and a second experiment plan;
   generating an integrated experiment plan by merging the first experiment plan and the second experiment plan according to a merge constraint and an integration rule, wherein the merge constraint defines rules that any two experiment plans can be merged, the integration rule determines the content of the integrated experiment plan based on the first experiment plan and the second experiment plan; and
   storing the integrated experiment plan.

14. The method of claim 13 wherein the merge constraint defines that the first experiment plan and the second experiment plan can be merged when both the first and second experiment plans use the same technology and optical mask.

15. The method of claim 13 wherein the merge constraint defines that both the first experiment plan and the second experiment plan having mergable processing steps can be merged.

16. The method of claim 13 wherein the merge constraint defines that the second experiment plan can be merged into the first experiment plan having no destructive test.

17. The method of claim 13 further comprising the steps of:
   transmitting a merge notice prompting that the first experiment plan and the second experiment plan can be merged; and
   receiving a confirmation message corresponding to the merge notice, the confirmation message representing acceptance of the merge action.

18. The method of claim 13 wherein the integration rule determines sample quantity, route type, and/or experiment time for the integrated experiment plan.

19. The method of claim 13 wherein the integration rule acquires a maximum sample quantity of the first and second experiment plans as a integrated sample quantity for the integrated sample plan.

20. The method of claim 13 wherein the integration rule determines processing steps for the integrated experiment plan based on processing steps in the first and second experiment plans.

21. The method of claim 13 further comprising a step of loading and performing the integrated experiment plan by a manufacturing execution system (MES) or a computer incorporation manufacturing (CIM) system.

22. The method of claim 21 wherein the MES or CIM system performs the integrated experiment plan with a semiconductor fabrication tool.

23. A machine-readable storage medium for storing a computer program which when executed performs a method of experiment management, the method comprising the steps of:
   acquiring a first experiment plan and a second experiment plan;
   generating an integrated experiment plan by merging the first experiment plan and the second experiment plan according to a merge constraint and an integration rule, wherein the merge constraint defines rules that any two experiment plans can be merged, the integration rule determines the content of the integrated experiment plan based on the first experiment plan and the second experiment plan; and
   storing the integrated experiment plan.

* * * * *